Figure 1:
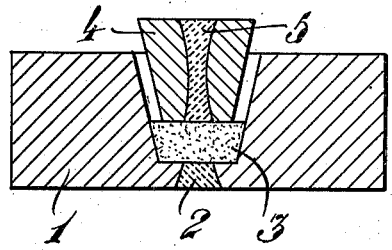

Feb. 18, 1941.  H. UNCKEL  2,232,417

METHOD OF MANUFACTURING DRAWING DISKS

Filed Oct. 15, 1937

Inventor
Herman Unckel
by Sommers & Young
Attys.

Patented Feb. 18, 1941

2,232,417

UNITED STATES PATENT OFFICE 2,232,417

METHOD OF MANUFACTURING DRAWING DISKS

Herman Unckel, Finspong, Sweden

Application October 15, 1937, Serial No. 169,335
In Sweden September 8, 1937

5 Claims. (Cl. 76—107)

Wire drawing disks are known in which the effective portion or the die consists of a body of some hard non-metallic material, such as corundum or the like, mounted in a metallic holder. On account of the very great brittleness of such hard non-metallic materials it is of essential importance for the tenability of the disk that the die be fastened in the holder in such manner that too great tensile stresses shall not arise in the material during the drawing operation. It has been proposed for such purpose to shrink the holder onto the non-metallic die, preferably with an intermediate layer of a soldering metal. When shrinking the holder on the die without an intermediate layer it is necessary to have the die carefully ground on the outer surface so that the inner surface of the metallic holder will fit closely to the surface of the die, as otherwise the die easily cracks during the shrinking or in the subsequent use of the drawing disk. An intermediate layer, for instance of soldering metal, helps to smooth out any unevenness on the outer surface of the die so that the expensive grinding of the latter may be dispensed with. The application of the soldering metal is however a rather troublesome procedure and furthermore has the drawback that the molten solder does not wet the non-metallic material of the die by adhesion but easily forms drops and thus is unevenly distributed between the die and the holder. It has also been proposed to give the fitting surfaces a conical shape and to apply an intermediate layer of metal foil or of a powder in order to fill out any unevenness between the die and the holder and thus secure a uniform fit between the die and the holder. It was, however, in such case, not possible to attain a simultaneous support of the bottom surface of the die which, however, is of great importance as the die is easily cracked when subjected to great stresses without being supported at its end.

The chief object of the present invention is to avoid the above-mentioned drawbacks by a new method of mounting the non-metallic die in the holder. The invention consists, chiefly, in this that as an intermediate layer and binding agent between the die and the holder a non-metallic binding agent is used which in molten state wets and adheres to the metal of the holder as well as to the non-metallic material of the die and which after solidifying forms a hard glassy mass of high mechanical strength. Such materials are, for instance, borax, glass and enamel.

Before mounting the die in the holder the drawing channel of the die as well as the exit opening of the holder are, preferably, filled with some refractory material, as for instance asbestos. In the recess of the holder a suitable quantity of the binding agent is then placed, preferably in a powdered state. The die is then placed on the binding agent and the whole is heated in a suitable furnace until the binding agent melts and the die sinks down into the recess of the holder. By exerting a light pressure on the die while the binding agent is in a molten state, the excess of the latter may be removed so that only a thin layer of binding agent will remain between the bottom and the side walls of the recess in the holder on one side and the end surface and the mantle surface of the die on the other side. The die and the holder are then cooled whereby the holder shrinks until it closely surrounds the die. Finally the refractory material is removed from the drawing channel of the die and the exit opening of the holder and, if required, the drawing channel is ground, whereupon the drawing disk is ready for use. By the great mass of the holder in comparison with the die the heating of the latter takes place rather slowly whereby heating cracks in the die are avoided.

Figure 2:
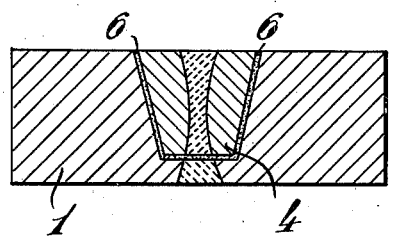
Figure 3:
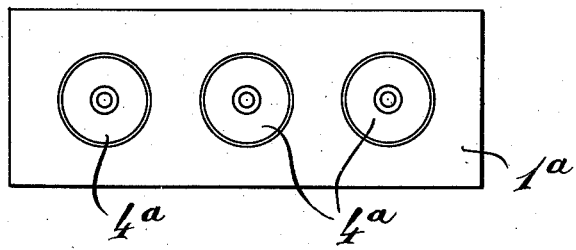
Figure 4:
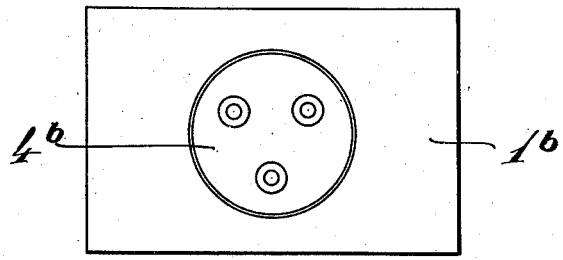

The accompanying drawing illustrates some embodiments of the invention. Fig. 1 is a vertical section of the die and its holder before the binding agent has melted. Fig. 2 is a similar view after the melting of the binding agent. Fig. 3 shows a drawing disk having three dies. Fig. 4 shows a drawing disk with a die having three drawing channels.

Referring now Fig. 1 of the drawing, I is the metallic holder, 2 is the exit opening of the holder which is filled with asbestos or other refractory material, 3 is a pulverulent binding agent placed in the recess of the holder, 4 is the die placed upon the binding agent, and 5 is the drawing channel of the die which is likewise filled with asbestos or other refractory material. In Fig. 2, which illustrates the step of the manufacture, when the binding agent has melted, the die has sunk down into the recess of the holder while displacing the excess of binding agent so that the remaining portion thereof forms a thin layer 6 below the bottom of the die and around its mantle surface.

The method described may be used for the manufacture of wire drawing disks having two or several dies in a common metallic holder, as for instance is illustrated in Fig. 3 which shows an elevation of a metallic holder 1a with three non-metallic drawing dies 4a. The invention may also be used for the manufacture of drawing disks with a die having two or more drawing channels, as for instance is illustrated in Fig. 4, which shows an elevation of a metallic holder 1b with a non-metallic die 4b provided with three drawing channels.

The non-metallic die is, preferably, manufactured from a ceramic mass the chief constituent of which consists of aluminium oxide amounting to from 60 to 98%. It has been found that ceramic materials containing a high percentage of mullite, 3 $Al_2O_3.2 SiO_2$, or sillimanite, $Al_2O_3.SiO_2$, or similar compounds of aluminium oxide and silica are very suitable for drawing disks on account of their great hardness and resistance against wearing. Ordinary china which is burnt at a temperature between 1400 and 1600° C. contains as chief constituents kaolin, silica and felspar in varying proportions, the content of alumina amounting to 20 to 30% and the content of silica to 30 to 70% while the remainder consists of oxides of potassium, sodium, calcium and manganese. In the burning process certain reactions take place whereby the original constituents are changed and combined with each other. By said reactions new compounds, for instance mullite, are formed. The ordinary china contains, however, a comparatively small percentage of said compound. Hard china having a higher content of alumina than the ordinary china contains somewhat more mullite. By increasing the percentage of alumina over the amount generally present in hard china while reducing the content of alkali below 10% a product may be obtained which after the burning consists substantially of mullite or sillimanite. It is not known which compounds or solid solutions are formed when a higher percentage of alumina than that corresponding to the composition of the mullite or the sillimanite respectively is used, but such compounds or solid solutions also have a very high hardness and resistance against wearing. When the content of alumina is increased to nearly 100% the composition and properties of the product successively approach those of sintered corundum.

What I claim is:

1. In the manufacture of drawing disks having a non-metallic ceramic die and a metallic holder provided with a recess for the die, the method of mounting the die in the holder, which comprises placing the die in the recess of the holder together with an intermediate layer of a non-metallic vitrifiable pulverulent binding agent capable of wetting the metal of the holder as well as the material of the die when in a molten state and to form a hard glassy mass of high mechanical compressive strength when solidified after melting, heating the whole to a temperature at which the pulverulent binding agent melts to form a flux which fills out the interstices between the bottom and the side walls of the recess of the holder on the one side and the adjacent surfaces of the die on the other side, and then allowing the structure to cool so as to cause the holder to closely surround the die and the intermediate binding agent by shrinking.

2. In the manufacture of drawing disks having a perforated non-metallic ceramic die and a metallic holder provided with a recess with perforated bottom for the die, the method of mounting the die in the holder, which comprises filling the perforations of the die and the holder with a refractory material, then placing the die in the recess of the holder together with an intermediate layer of a non-metallic vitrifiable pulverulent binding agent adapted to form a hard glassy mass of high mechanical compressive strength when solidified after melting, heating the whole to a temperature at which the pulverulent binding agent melts to form a flux which fills out the space between the bottom and the side walls of the recess of the holder on one side and the adjacent surfaces of the die on the other side, allowing the structure to cool, and finally removing the refractory material from the perforations of the die and the holder.

3. A method as claimed in claim 1, in which the binding agent used is borax.

4. A method as claimed in claim 1, in which the binding agent used is glass.

5. In the manufacture of wire drawing disks having a non-metallic ceramic die and a metallic holder provided with a recess or the like, the method of mounting the die in the holder, which comprises placing the die in the recess of the holder together with an intermediate layer of a vitrifiable, enamel-forming pulverulent binding agent, heating the whole to a temperature at which the pulverulent binding agent melts to an enamel flux which fills out the interstices between the bottom and the side walls of the recess on one side and the adjacent surfaces of the die on the other side, and cooling the structure so as to cause the holder to closely surround the die and the intermediate binding enamel by shrinking.

HERMAN UNCKEL.